(12) United States Patent
Reddy et al.

(10) Patent No.: US 7,575,055 B2
(45) Date of Patent: Aug. 18, 2009

(54) STORABLE NONAQUEOUS CEMENT SLURRIES AND METHODS OF USING SAME

(75) Inventors: B. Raghava Reddy, Duncan, OK (US); Mfon Antia, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 357 days.

(21) Appl. No.: 11/428,771

(22) Filed: Jul. 5, 2006

(65) Prior Publication Data

US 2008/0006404 A1    Jan. 10, 2008

(51) Int. Cl.
    *E21B 33/13* (2006.01)
(52) U.S. Cl. .................................................. 166/292
(58) Field of Classification Search ............ 166/292
    See application file for complete search history.

(56) References Cited

U.S. PATENT DOCUMENTS

| | | | | |
|---|---|---|---|---|
| 2,796,131 A | * | 6/1957 | Hinchliffe et al. | 166/281 |
| 2,800,963 A | * | 7/1957 | Roberts et al. | 166/293 |
| 2,890,752 A | * | 6/1959 | Crone et al. | 166/293 |
| 3,022,824 A | * | 2/1962 | Robinson, Jr. et al. | 166/293 |
| 3,242,986 A | * | 3/1966 | Hower | 166/293 |
| 3,955,993 A | * | 5/1976 | Curtice et al. | 106/662 |
| 4,891,072 A | | 1/1990 | Cooper | |
| 5,389,145 A | * | 2/1995 | Gupta et al. | 106/807 |
| 2004/0171499 A1 | * | 9/2004 | Ravi et al. | 507/200 |
| 2005/0092491 A1 | | 5/2005 | Chatterji et al. | |
| 2006/0035789 A1 | * | 2/2006 | Mas et al. | 507/261 |

OTHER PUBLICATIONS

Foreign Communication from a counter part application- International Search Report and Written Opinion of PCT/GB2007/002373 (8 pgs) dated Dec. 17, 2007.

* cited by examiner

*Primary Examiner*—William P Neuder
*Assistant Examiner*—Nicole A Coy
(74) *Attorney, Agent, or Firm*—Craig W. Roddy; Conley Rose, P.C.

(57) ABSTRACT

A method of servicing a wellbore comprising preparing a nonaqueous storable cementitious composition, mixing said composition with an aqueous fluid and, placing said composition into a wellbore. A method of cementing comprising preparing a mixture of cement, a suspension fluid, a dehydrating agent, a first surfactant, and a suspension aid, adding an aqueous solution and a second surfactant to said mixture and, placing the mixture downhole, and allowing the cement to set. A method of producing a lightweight cement slurry comprising the addition of a nonaqueous fluid to cement and water wherein the water content is less than about 40% by total weight of the composition. A method of servicing a wellbore comprising preparing a cement composition comprising from about 80% by weight cement suspended in a nonaqueous fluid, and stabilizing said cement composition through the addition of a suspension aid.

28 Claims, No Drawings

STORABLE NONAQUEOUS CEMENT SLURRIES AND METHODS OF USING SAME

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This disclosure relates to compositions for servicing a wellbore. More specifically, this disclosure relates to methods of preparing storable nonaqueous cement slurries and the use of same.

2. Background of the Invention

A natural resource such as oil or gas residing in a subterranean formation can be recovered by drilling a well into the formation. The subterranean formation is usually isolated from other formations using a technique known as well cementing. In particular, a wellbore is typically drilled down to the subterranean formation while circulating a drilling fluid trough the wellbore. After the drilling is terminated, a string of pipe, e.g., casing, is run in the wellbore. Primary cementing is then usually performed whereby a cement slurry is pumped down through the string of pipe and into the annuals between the string of pipe and the walls of the wellbore to allow the cement slurry to set into an impermeable cement column and thereby seal the annulus. Subsequent secondary cementing operations, i.e., any cementing operation after the primary cementing operation, may also be performed. One example of a secondary cementing operation is squeeze cementing whereby a cement slurry is forced under pressure to areas of lost integrity in the annulus to seal off those areas.

These cementing operations may employ the use of storable aqueous cement slurries retarded to remain pumpable over extended time periods. While these slurries have many advantages they hold several potential drawbacks. In particular, one of the problems encountered with such slurries is the higher cost of transporting the slurry to locations considering the relatively high ratio of water to cement which can be contrasted to the costs incurred with transport of dry cement blends and on-site mixing with water. The most direct way to address these issues would require increasing the amount of cement in these slurries, however, the resulting viscosity increase would render the slurry unpumpable. An additional drawback to the use of such slurries is although they are formulated for extended storage, the duration of storage is limited. Over time the water in the slurries hydrates the cementitious material resulting in adverse advents such as gellation. Thus, a need exists for a storable cement slurry having a decreased liquid to cement ratio with an extended shelf life

BRIEF SUMMARY OF SOME OF THE PREFERRED EMBODIMENTS

Disclosed herein is a method of servicing a wellbore comprising preparing a nonaqueous storable cementitious composition mixing said composition with an aqueous fluid and, placing said composition into a wellbore.

Also disclosed herein is a method of cementing comprising preparing a mixture of cement, a suspension fluid, a dehydrating agent, a first surfactant, and a suspension aid, adding an aqueous solution and a second surfactant to said mixture and, placing the mixture downhole, and allowing the cement to set.

Further disclosed herein is a method of producing a lightweight cement slurry comprising the addition of a nonaqueous fluid to cement and water wherein the water content is less than about 40% by total weight of the composition.

Further disclosed herein is a method of servicing a wellbore comprising preparing a cement composition comprising from about 80% by weight cement suspended in a nonaqueous fluid, and stabilizing said cement composition through the addition of a suspension aid.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DETAILED DESCRIPTION OF THE PREFERRED EMBODIMENTS

Disclosed herein are nonaqueous storable cement compositions (NSCCs). Said NSCCs may comprise cement, a suspension fluid, and a dehydrating agent. For example, the dehydrating agent may be added to the suspension fluid prior to addition of the cement, may be added dry blended with the cement, or both. Alternatively, said NSCCs may comprise cement, a suspension fluid, a dehydrating agent, and optionally one or more compounds selected from the group consisting of a viscosifier, a suspension aid, an oil-wetting surfactant, a water-wetting surfactant, and other additives described herein. Alternatively, said NSCCs may comprise cement, a suspension fluid, a dehydrating agent, and a viscosifier. Alternatively, said NSCCs may comprise cement, a suspension fluid, a dehydrating agent, a viscosifier, a suspension aid and an oil-wetting surfactant. Alternatively, said NSCCs may comprise cement, a suspension fluid, a dehydrating agent, a viscosifier, a suspension aid, an oil-wetting surfactant and a water-wetting surfactant. An NSCC as disclosed herein may serve as the base composition in the preparation of a cement slurry for use in servicing a wellbore. Said NSCCs may have a decreased liquid to cement ratio and exhibit an extended storage time when compared to aqueous storable cement compositions. In an embodiment, an NSCC is prepared that does not contain a water-wetting surfactant, but rather a water-wetting surfactant may optionally be added upon addition of an aqueous fluid to the NSCC to produce a settable cement slurry.

In an embodiment, the NSCC comprises cement. The NSCC may comprise cement such as hydraulic cement, which includes calcium, aluminum, silicon, oxygen, and/or sulfur and which sets and hardens by reaction with water. Examples of hydraulic cements include but are not limited to Portland cements (e.g., classes A, C, G and H Portland cements), pozzolana cements, gypsum cements, phosphate cements, high alumina content cements, silica cements, high alkalinity cements, magnesia cements and combinations thereof.

In an embodiment, the NSCC comprises a suspension fluid. The suspension fluid may be a single fluid or a combination of fluids. In an embodiment, the suspension fluid may be any nonaqueous fluid that is chemically compatible with the other components of the NSCC and suitable for providing a pumpable slurry. In an alternative embodiment, the suspension fluid is any nonaqueous fluid that is chemically compatible with the other components of the NSCC with a flash point of equal to or greater than about 140° F. and suitable for providing a pumpable slurry. Examples of suitable suspension fluids include but are not limited to aliphatic hydrocarbons such as, internal olefins, linear alpha olefins, poly alpha olefins, diesel, mineral oil, kerosene, silicone fluids or combinations thereof Alternatively, the suspension fluid is an oxygenated solvent such as ethylene glycol, ethylene glycol monoalkyl ether, ethylene glycol dialkyl ether or combinations thereof wherein the alkyl groups are methyl, ethyl, propyl, butyl and the like. In an embodiment, the density of suspension fluids suitable for use in this disclosure may be in the range of from about 0.7 g/cc to about 1.5 g/cc. The suspension fluid may be present in an amount of from about 5% by total weight of the composition, alternatively of from about 8%, alternatively of from about 10%.

In an embodiment, the NSCC comprises a dehydrating agent. The dehydrating agent may function to reduce the water content of the suspension fluid upon contacting same. In an embodiment, the dehydrating agent is any material chemically compatible with the other components of the NSCC and able to reduce the water content of the suspension fluid. Alternatively, the dehydrating agent is any noncementitious material with an affinity for water and is capable of reducing the water content of the non-aqueous fluid to less than about 5% by weight when used in amounts of equal to or less than about 25% by weight of the nonaqueous fluid. In an embodiment, the dehydrating agent may comprise high surface area or highly porous materials containing hydrophilic surfaces. Examples of such dehydrating agents include without limitation high surface area silica, alumina, zeolitic materials, molecular sieve materials or combinations thereof. In an embodiment, the dehydrating agent comprises a zeolitic material. Zeolites are a group of natural or synthetic hydrated aluminosilicate minerals that contain alkali and alkaline metals. They are characterized by a framework structure that encloses interconnected cavities occupied by ion-exchangeable large metal cations and water molecules permitting reversible dehydration. An example of a suitable zeolitic material includes without limitation SILIPORITE molecular sieve which is a synthetic zeolite commercially available from Ceca Arkema group.

Alternatively, the dehydrating agent is a cementitious material that is herein termed "sacrificial cement" which is used for removing water from the suspension fluid but does not contribute to the final mechanical properties of the NSCC. In such embodiments, the cementitious material may be added to the suspension fluid in amounts of from about 1% to about 25%, alternatively of from about 5% to about 20%, alternatively of from about 10% to about 15% by weight of the suspension fluid. Methods of using the dehydrating agent to reduce the water content of the suspension fluid will be described in detail later herein.

In an embodiment, the NSCC comprises a suspension aid. The suspension aid may function to reduce or prevent the settling of cement particles and allow such particles to remain suspended in the NSCC. In an embodiment, the suspension aid comprises any material chemically compatible with the other components of the NSCC and able to reduce or prevent the settling of the cement particles. Alternatively, the suspension aid comprises a partially or completely soluble polymer which may be a homopolymer, copolymer, terpolymer or combinations thereof. Herein a polymer may be considered soluble if it has solubility of at least 1% in the suspension fluid at room temperature (defined as 70-80° F.). In an embodiment the suspension aid may comprise organically surface modified inorganic solids, for example organophilic clay, organophilic glass or mineral fibers and the like.

In some embodiments, the suspension aid may be an elastomer. Without limitation, examples of suitable elastomers include polymerized dienes such as butadiene, isoprene and hexadiene; monoolefins such as ethylene, butene, and 1-hexene; or combinations thereof. In an embodiment, the elastomer includes polymers comprising aromatic hydrocarbon monomers and aliphatic dienes. Examples of suitable aromatic hydrocarbon monomers include without limitation styrene, alpha-methyl styrene and vinyltoluene. In an embodiment, the elastomer is a crosslinked or partially crosslinked material. Alternatively, the elastomer comprises a polyolefin grafted with polar monomers. Examples of polymer monomers that may be grafted onto the polyolefin include without limitation maleic anhydride, acrylic acid, alkyl acrylic acid, vinylsulfonic acid, acrylamido-2-methyl-propane sulfonic acid, alkyl sulfonic acid, acrylonitrile, acrylate esters for example methylmethacrylate, styrene sulfonic acid and the like. Alternatively, the polar monomers may be added during polymerization using the aromatic hydrocarbon monomers described previously herein. In an embodiment, the elastomer comprises a polyolefin grafted with maleic anhydride such as for example and without limitation RICOBOND 1731 which is a low molecular weight polybutadiene functionalized with maleic anhydride commercially available from Sartomer Company. In an embodiment, an NSCC comprises a suspension aid present in amounts of from about 0.05% to about 10%, alternatively from about 0.1% to about 5%, alternatively from about 0.3% to about 10% by weight of the suspension fluid. Without being bound by theory, it is speculated that polar groups in the suspension aid elastomer stabilize cement suspension by bonding to the polar surfaces of multiple cement particles.

In an embodiment, the NSCC comprises a viscosifying agent. The viscosifying agent may function to assist in suspension of the cementitious material in the suspension fluid by increasing the viscosity of the suspension fluid. In an embodiment, the viscosifying agent is any material chemically compatible with the other components of the NSCC and able to increase the viscosity of the suspension fluid. Alternatively, the viscosifying agent is an organically modified inorganic solid, a dissolved organic polymer, an organophosphate/iron salt combination, a fatty acid salt and aluminum salt combination or combinations thereof The organic polymer may be a hydrocarbon homopolymer, copolymer or terpolymer of random or block structures, linear or radial structures and may comprise aliphatic monomers, for example dienes such as butadiene, isoprene and hexadiene; monoolefins such as ethylene, butene, and 1-hexene;vinylaromatic monomers such as styrene, alpha-methylstyrene or combinations thereof An example of a suitable viscosifying agent includes without limitation KRATON G1702 oil viscosifier, a block terpolymer of styrene, ethylene and propylene available from Kraton Polymers Inc., Houston, Tex. Alternatively, the elastomer comprises a polyolefin grafted with polar monomers. Polar monomers that may be grafted -onto the polyolefin include for example and without limitation maleic anhydride, acrylic acid, alkyl acrylic acid, vinylsulfonic acid, acrylamido-2-methyl-propane sulfonic acid, alkyl sulfonic acid, acrylonitrile, acrylate esters such as for example methylmethacrylate, styrene sulfonic acid and the like. Alternatively, the polar monomers may be added during polymerization using the aliphatic monomers, vinylaromatic monomers or monoolefins described previously herein. In some embodiments, the same material may function as both the viscosifying agent and suspension aid. In an embodiment, an NSCC comprises a viscosifying agent present in amounts of from about 0.1% to about 10%, alternatively from about 0.5% to about 5%, alternatively from about 1% to about 3% by weight of the suspension fluid.

In an embodiment, the NSCC comprises a surfactant. In some embodiments, the surfactant may be included with the NSCC prior to hydration of the NSCC and formation of a slurry to be used in the servicing of a wellbore. In such embodiments, the surfactant may function as an oil-wetting surfactant (OWS) and facilitate the suspension of the cementitious material in the nonaqueous suspension fluid. In such an embodiment, the OWS is soluble in the suspension fluid. The OWS may be any material chemically compatible with the other components of the NSCC and having a hydrophilic-lipophilic balance (HLB) ratio of less than or equal to 7. The HLB is a system used to categorize surfactants according to the balance between the hydrophilic and lipophilic portions of their molecules. The HLB value indicates the polarity of the molecules in an arbitrary range of 1 to 40 with the most commonly used surfactants having a value of between 1 to 20. The HLB value increases with increasing hydrophilicity. Consequently, an OWS or one designed to promote coating of the cementitious material with the nonaqueous suspension fluid would have a low HLB value. The OWS may be a nonionic, anionic, or cationic. In an embodiment, the NSCC comprises at least one OWS with an HLB of less than or equal to 7. Alternatively, the NSCC may comprise more than one OWS which when combined have a calculated average HLB ratio of less than or equal to 7. Examples of a suitable OWS include without limitation nonylphenylethoxylates with less than 5 moles of ethylene oxide, fatty acids and their salts, sorbitan trioleate, sorbitan monopalmitate, sorbitan monostearate, propylene glycol monolaurate, propylene glycol monostearate, sorbitan distearate and any combination of such surfactants. In an embodiment, an NSCC comprises an OWS present in amounts of from about 0.1% to about 10%, alternatively from about 0.3% to about 6%, alternatively from about 0.5% to about 4% by weight of the suspension fluid.

In some embodiments, additives may be included in the NSCC for improving or changing the properties thereof Examples of such additives include but are not limited to salts, accelerants, set retarders, defoamers, fluid loss agents, weighting materials, dispersants, vitrified shale, formation conditioning agents, or combinations thereof. Other mechanical property modifying additives, for example, carbon fibers, glass fibers, metal fibers, minerals fibers, and the like can be added to further modify the mechanical properties. These additives may be included singularly or in combination. Methods for introducing these additives and their effective amounts are known to one of ordinary skill in the art.

In an embodiment, an NSCC may be prepared by the addition of the components in any order desired by the user. Alternatively, the NSCC may be prepared by the addition of the components in the order to be described. In an embodiment, an NSCC is prepared by the addition of a dehydrating agent to the suspension fluid. The dehydrating agent may be contacted with the suspension fluid prior to the addition of any other components of the NSCC and allowed to reduce the water content in the suspension fluid in the NSCC. The dehydrating agent and suspension fluid may be contacted for a time period sufficient to substantially dehydrate the suspension fluid. For example, the dehydrating agent may be added to the suspension fluid prior to addition of the cement, may be added dry blended with the cement, or both. Herein dehydration of the suspension fluid refers to reducing the amount of aqueous material in the suspension fluid to less than about 5%, alternatively less than 1% by weight of the non-aqueous fluid. As will be understood by one of ordinary skill in the art the time necessary to substantially dehydrate the suspension fluid will depend on numerous factors such as the amount of suspension fluid and the amount and nature of the dehydrating agent. As such, the time necessary for dehydration of the suspension fluid may be designed by one skilled in the art to meet the needs of the user. After the dehydration period, the suspension fluid may be separated from the dehydrating agent prior to mixing with the cement composition, or alternatively the cement composition may be added directly to the suspension fluid without separating the dehydrating agent. In an alternative embodiment, the dehydrating agent is dry mixed with the cement and subsequently combined with the suspension fluid and other components of the NSCC. In an alternative embodiment, the dehydrating agent, suspension aid, and other components of the NSCC are combined at approximately the same time.

The components of the NSCC may be combined using any mixing device compatible with the composition, for example a bulk mixer. In an embodiment, the components of the NSCC are combined at the site of the wellbore. Alternatively, the components of the NSCC are combined off-site and then later used at the site of the wellbore. The NSCCs disclosed herein when prepared as described may contain up to about 90% solid cementitious content by weight of the total composition. Such NSCCs may be storable for an indefinite time period. Such stored slurries may be stirred periodically, for example once a week to maintain a homogeneous suspension. Alternatively, such NSCCs may be used immediately in the preparation of a cement slurry for use in servicing a wellbore.

In an embodiment, a cement slurry for use in servicing a wellbore may be prepared through the use of an NSCC as the base composition. In such embodiments, the cement slurry may be prepared having a user desired density through the addition of an aqueous solution and an optional surfactant to an NSCC of the type disclosed herein. Hereafter, a cement slurry for use in servicing a wellbore that has been prepared by the addition of aqueous solution to an NSCC is referred to as a settable cement slurry (SCS).

In an embodiment, an SCS is prepared by the addition water or an aqueous solution and a surfactant having an HLB greater than or equal to 10 to the NSCC. Such surfactants may function as water-wetting surfactants (WWS) and may aid in the hydration of the cementitious material. For example, a WWS may prevent the separation of the nonaqueous fluid as a separate layer after an NSCC has been exposed to water by causing formation oil-in-water emulsions. The effect of surfactant is to convert the slurries to a water-external phase with the non-aqueous fluid as the dispersed phase as well as to render the cement particle surfaces hydratable. The WWS may be any material chemically compatible with the other components of the NSCC and having a HLB of greater than or equal to 10. Such WWS may be nonionic, anionic or cationic. In an embodiment, the NSCC comprises at least one WWS with an HLB of greater than or equal to 10. Alternatively, the NSCC may comprise more than one WWS which when combined have a calculated average HLB ratio of greater than or equal to 10. An example of a suitable WWS includes without limitation DUAL SPACER B surfactant, which is an ethoxylated nonylphenol surfactant commercially available from Halliburton Energy Services. Examples of other suitable WWS include without limitation polyoxyethylene sorbitan based surfactants, commonly referred to as TWEEN surfactants, for example, TWEEN® 20, TWEEN® 40, TWEEN® 60, TWEEN® 80, TWEEN® 81 or any combination such surfactants. Such materials are available from many surfactant vendors or from chemical companies such as Aldrich Chemical Company. In an embodiment, an SCS is formed by the addition of a WWS to a NSCC in amounts of from about 0.1% to about 10%, alternatively from about 0.3% to about 6%, alternatively from about 0.5% to about 4% by weight of water.

The SCS may include a sufficient amount of water to form a pumpable slurry. The water may be fresh water or salt water, e.g., an unsaturated aqueous salt solution or a saturated aqueous salt solution such as brine or seawater. The amount of aqueous solution (i.e. water) to be added to the NSCC to produce the desired SCS may be determined based on the desired density and cement hydration requirements by one of ordinary skill in the art. In an embodiment, the amount of water added is sufficient to hydrate the cement completely, and may be in the range of from about 30% to about 150%, alternatively from about 39% to about 60% by weight of cement. In an embodiment, the SCS produced according to the disclosure herein does not form a plugging gunk immediately upon contacting water but rather remain pumpable for a suitable time to be placed down hole for various wellbore cementing operations as described herein. "Gunk Plug" or "Gunk Squeeze" compositions refer to slurries that consist of bentonite, cement or polymers mixed into a non-aqueous fluid. The slurries are typically pumped downhole to wellbores experiencing lost circulation to seal the leaky zone. Water downhole interacts with bentonite, cement or polymers to make a stick plug or gunk plug instantly upon contacting water.

The SCS may optionally comprise additives for controlling slurry properties such as set time. For example and without limitation, suitable additives for controlling slurry properties include retarders or accelerators, dispersants, viscosifying agents, fluid loss control agents, density-increasing or density-decreasing materials, settling prevention additives, gas migration additives and the like. Such additives may be included as needed to the slurry either prior, during or after the addition of water. In an embodiment, an SCS of this disclosure may be formed into a pumpable slurry which may be characterized as uniform and homogeneous throughout without separation of non-aqueous fluid and exhibiting stable rheological properties.

In some embodiments, the NSCC may be used as the base composition in the formation of a lightweight cementitious slurry. Such slurries may have a density of from about 5 to about 14 ppg, alternatively from about 8 to about 12 ppg, alternatively from about 10 to about 12 ppg. The formation of a lightweight settable cement slurry (LSCS) may be accomplished by utilizing a low density non-aqueous suspension fluid as a light weight material at the time of preparation of NSCC or through the addition of both an aqueous fluid and additional nonaqueous fluid to the NSCC at the time of preparation of the SCS slurry. A suitable density range for the non-aqueous fluid is from about 0.7 g/cc to less than about 1.0 g/cc. In such embodiments, the density of the cement slurry may be lowered by the addition of about 40% by weight of cement of an aqueous solution and a calculated amount of nonaqueous fluid to the NSCC to obtain the desired density. Suitable aqueous and nonaqueous fluids have been described previously herein. The amount of aqueous fluid, nonaqueous fluid, or both necessary to achieve the desired density may be determined by one of ordinary skill in the art.

In an embodiment, the NSCCs prepared as described may display desirable properties such as an extended shelf life and a reduced cost associated with the transport of cement compositions having a reduced liquid to cement ratio. Such NSCCs may be storable for an extended time period without requiring frequent mixing of the composition to prevent premature gellation or the settling of cementitious material. For example, such NSCCs may be stored and mixed every 24-48 hours. While such NSCCs may be stored for an extended time period they may also be transformed immediately into an SCS or LSCS as described previously and used in the servicing of a wellbore as will be described in more detail later herein. Alternatively, the NSCC slurry may be pumped without mixing with an aqueous fluid, and allowed to contact the aqueous fluid in the subterranean formation, for example in produced water control applications. Alternatively, the NSCC slurry may be pumped as such without mixing with an aqueous fluid into a subterranean zone, for example, where loss circulation is encountered and commingled with an aqueous fluid downhole or on the surface for use in loss circulation applications. Alternatively, the NSCC may be used as a displacement, settable fluid to displace non-aqueous drilling fluids, so that the conventional primary cementing job done subsequently would have an improved bonding to the formation and the pipe because of replacement of any undisplaced drilling fluid pockets by the settable cementitious NSCC.

The NSCCs and SCS or LSCS prepared there from as disclosed herein may be used as wellbore servicing fluids. As used herein, a "servicing fluid" refers to a fluid used to drill, complete, work over, fracture, repair, or in any way prepare a wellbore for the recovery of materials residing in a subterranean formation penetrated by the wellbore. Examples of servicing fluids include, but are not limited to, cement slurries, drilling fluids or muds, spacer fluids, fracturing fluids or completion fluids, all of which are well known in the art. The servicing fluid is for use in a wellbore that penetrates a subterranean formation. It is to be understood that "subterranean formation" encompasses both areas below exposed earth and areas below earth covered by water such as ocean or fresh water. For simplicity hereafter the NSCCs and SCS or LSCS prepared there from are referred to collectively as cement slurries (CS).

The CS may be introduced to the wellbore to prevent the loss of aqueous or non-aqueous drilling fluids into loss-circulation zones such as voids, vugular zones, and natural or induced fractures while drilling. In an embodiment, the CS is placed into a wellbore as a single stream and activated by downhole conditions to form a barrier that substantially seals loss circulation zones. In such an embodiment, the CS may be placed downhole through the drill bit forming a composition that substantially eliminates the lost circulation. Methods for introducing compositions into a wellbore to seal subterranean zones are described in U.S. Pat. Nos. 5,913,364; 6,167,967; and 6,258,757, each of which is incorporated by reference herein in its entirety.

The CS may form a non-flowing, intact mass with good strength and capable of withstanding the hydrostatic pressure inside the loss-circulation zone. Said CS may plug the zone and inhibit the loss of subsequently pumped drilling fluid thus allowing for further drilling. It is to be understood that, it may be desired to hasten the viscosification reaction for swift plugging of the voids. In these cases, the WWS and aqueous fluid may be left out of the composition during pumping of NSCC and the surfactant amounts adjusted appropriately so that upon contact with water in the loss circulation zone it will form a viscous mass rapidly. Alternatively, it may be desired to prolong or delay the viscosification for deeper penetration into the voids. For example the CS may form a mass that plugs the zone at elevated temperatures, such as those found at higher depths within a wellbore. In these cases, a WWS, and optionally a set retarder, may be added to NSCC so that upon contact with water, the slurry will remain as fluid for desired time before it forms a viscous mass.

In an embodiment, the CS may be employed in well completion operations such as primary and secondary cementing operations. The CS may be placed into an annulus of the wellbore and allowed to set such that it isolates the subterranean formation from a different portion of the wellbore. The CS thus forms a barrier that prevents fluids in that subterranean formation from migrating into other subterranean formations. Within the annulus, the CS also serves to support a conduit, e.g., casing, in the wellbore. In an embodiment, the wellbore in which the CS is positioned belongs to a multilateral wellbore configuration. It is to be understood that a multilateral wellbore configuration includes at least two principal wellbores connected by one or more ancillary wellbores.

In secondary cementing, often referred to as squeeze cementing, the CS may be strategically positioned in the wellbore to plug a void or crack in the conduit, to plug a void or crack in the hardened sealant (e.g., cement sheath) residing in the annulus, to plug a relatively small opening known as a microannulus between the hardened sealant and the conduit, and so forth. Various procedures that may be followed to use a sealant composition in a wellbore are described in U.S. Pat. Nos. 5,346,012 and 5,588,488, which are incorporated by reference herein in their entirety.

In other embodiments, additives are also pumped into the wellbore with CS. For example and without limitation, fluid absorbing materials, resins, aqueous superabsorbers, viscosifying agents, suspending agents, dispersing agents, or combinations thereof can be pumped in the stream with the CS disclosed.

EXAMPLES

The invention having been generally described, the following examples are given as particular embodiments of the invention and to demonstrate the practice and advantages thereof. It is understood that the examples are given by way of illustration and are not intended to limit the specification of the claims in any manner.

Example 1

A cement slurry with a design density of 17.9 ppg was prepared by adding 400 grams Class H cement to 100 ml diesel fluid which has been pre-dried over calcium chloride and which contained 2 ml DOC-3 in a Waring blender at 5000 rpm. DOC-3 surfactant is a condensation product tall oil fatty acid and aminoethylethanolamine available from Halliburton Energy Services. A stable and pourable slurry was obtained.

Example 2

The composition described in Example 1 was repeated with the exception that the diesel fluid contained less than 1% water. A thick and pourable slurry was obtained which increased in viscosity in 24 hrs. The slurry had to be stirred because of settling after 24 hrs of storage.

Slurry compositions were tested for settling upon quiescent storage over at least a 24 hour period by stirring with a spatula. Settling was indicated by the presence of thick layer of solids at the bottom of container. Several slurries (Samples 3-12) were prepared and tested with various components while keeping the amounts of diesel and cement identical to that described in Example 2. The settling results for various compositions are provided in Table 1. "Hard settling" in Table 1 is defined as deposition of dry solid that is tightly compacted and is crumbly. "Soft settling" in Table 2 is defined as a fluidy, high-solids deposit that is not tightly compacted and flows slowly instead of crumbling.

Samples 3-12

The compositions of slurries are given in Table 1. For Samples 5-8, KRATON G polymer was dissolved into pre-dried diesel by adding the polymer with vigorous agitation to diesel and allowing the polymer to viscosify diesel overnight. KRATON G1702 oil viscosifier is a block terpolymer of styrene, ethylene and propylene available from Kraton Polymers Inc. The remaining ingredients were added to diesel as described in Example 1. For Samples 9-11 a similar procedure was used for preparing diesel containing KRATON G1702. For Sample 12, RICOBOND 1731 was dissolved into diesel containing KRATON G1702. RICOBOND 1731 is a low molecular weight polybutadiene functionalized with maleic anhydride commercially available from Sartomer Company.

TABLE 1

| Additive | Sample 2 | Sample 3 | Sample 4 | Sample 5 | Sample 6 | Sample 7 | Sample 8 | Sample 9 | Sample 10 | Sample 11 | Sample 12 |
|---|---|---|---|---|---|---|---|---|---|---|---|
| DOC-3 | 1.5 ml | | | | | | | 1.5 ml | 2.5 ml | 3.5 ml | 4.5 ml | 2.0 ml |
| SEM-7[1] | | 1.5 ml | | | | | | | | | |
| PEN-5[2] | | | 1.5 ml | | | | | | | | |
| EZ Mul[3] | | | | 1.5 ml | | | | | | | |
| SPAN 85 | | | | | 1.5 ml | | 1.5 ml | | | | |
| TWEEN 20[4] | | | | | | 1.5 ml | | | | | |
| Kraton G4620[5], % by wt of diesel | | | | 0.5 | 0.5 | 0.5 | 0.5 | | | | |
| Kraton G1702[5] % by wt of diesel | | | | | | | | | 1.5 | 1.5 | 1.5 | 1.5 |
| Ricobond 1731[6], % by wt of diesel | | | | | | | | | | | | 0.3 |
| Settling, 1 hr | Viscous layer | None | Thick, gunky | None | None | None | None | None | None | None | None |

TABLE 1-continued

| Additive | Sample 2 | Sample 3 | Sample 4 | Sample 5 | Sample 6 | Sample 7 | Sample 8 | Sample 9 | Sample 10 | Sample 11 | Sample 12 |
|---|---|---|---|---|---|---|---|---|---|---|---|
| Settling 24 hrs | Thick, semi-hard | Thick, pasty | Thick, gunky | Soft settling | Soft settling | Hard settling | Slight | Slight | Slight | Slight | None |

[1]anionic ethoxylated alcohol surfactant blend in alcohol solvent available from Halliburton Energy Services
[2]nonionic ethoxylated alcohol in aqueous alcohol available from Halliburton Energy Services
[3]polyaminated fatty acid available from Halliburton Energy Services
[4]Polyoxyethylene(20) sorbitan monolaurate available from Aldrich Chemical Company
[5]Kraton G4620, a hydrogenated styrene/butadiene block copolymer available from Kraton Polymers, Houston, Texas, USA.
[6]Carboxylate polybutadiene available from Sartomer Corporation.

The results shown in Table 1 indicate settling can be prevented or minimized for at least 24 hours by the addition of viscosifying elastomers either by themselves or in combination with carboxylated elastomers. A specific combination of KRATON G1702 and RICOBOND 1731 in the amounts of 1.5% and 0.3% by weight of diesel pre-dissolved in diesel provided a composition which did not settle in at least 24 hours. Compositions were optimized for maximum duration of storage, either under quiescent conditions or with periodical agitation by using diesel containing KRATON G1702 and RICOBOND 1731 and optimizing the surfactant composition. The storability of the compositions is measured by rheology measurements which would indicate any changes in the chemical nature of the compositions leading to viscosification and loss in flowability, as well as by periodic stirring with a spatula to identify any settling with time.

Samples 13-17

Cement slurry compositions for Samples 13-17 are given in Table 2.

TABLE 2

| | Sample 13 | Sample 14 | Sample 15 | Sample 16 | Sample 17 |
|---|---|---|---|---|---|
| DOC-3 | 2 ml | | 1.5 ml | 1 ml | 0.5 ml |
| SPAN 85 | | 2 ml | 0.5 ml | 1 ml | 1.5 ml |

The rheologies were measured immediately after mixing and after 24 hrs. The results are shown in Table 3.

Comparative Example 1

The composition in Sample 13 was repeated with the exception that 5 ml of water was added to diesel containing KRATON G1702 and RICOBOND 1731 prior to the addition of cement. A cement slurry with a design density of 17.7 pounds per gallon (ppg) was prepared by adding 400 grams Class H cement to 100 ml diesel containing 2 ml surfactant produced as a condensation product tall oil fatty acid and aminoethylethanolamine available from Halliburton Energy Services as DOC-3 and 5 ml water in a Waring blender at 5000 rpm. The slurry immediately became too viscous and non-pourable. This observation indicated that the presence of significant amounts of water in diesel will prevent preparation stable, storable cement slurries.

Comparative Example 2

The composition in Sample 14 was repeated with the exception that 5 ml of water was added to diesel containing KRATON G1702 and RICOBOND 1731 prior to the addition of cement. The slurry was more stable than that in Comparative Example 1. The rheology values are presented in Table 3. The rheological results show that sorbitan trioleate renders the slurry more water tolerant and provided a slurry which is stable for at least short periods. The slurry became too thick over 3-5 days.

TABLE 3

| Rpm | Sample 13 t = 0 hrs | Sample 13 t = 24 hrs | Sample 14 t = 0 hrs | Sample 14 t = 24 hrs | Comp. Ex. 2 t = 0 hrs | Comp. Ex. 2 T = 24 hrs | Sample 15 t = 0 hrs | Sample 16 t = 0 hrs | Sample 17 t = 0 hrs |
|---|---|---|---|---|---|---|---|---|---|
| 300 | 300+ | 300+ | 300+ | 300+ | 300+ | 300+ | 300+ | 300+ | 300+ |
| 200 | 300+ | 300+ | 300+ | 300+ | 300+ | 300+ | 300+ | 300+ | 300+ |
| 100 | 300+ | 300+ | 300+ | 265 | 275 | 300+ | 300+ | 300+ | 300+ |
| 6 | 90 | 100 | 67 | 90 | 70 | 85 | 70 | 71 | 65 |
| 3 | 25 | 41 | 17 | 35 | 16 | 39 | 21 | 20 | 22 |
| Settling | None | None | None | None | None | None | None | None | None |

The results in Table 3 indicate that non-settling compositions can be designed by using low water content diesel, suitable single or multiple surfactants and a polymer combination of a hydrocarbon elastomer such as a hydrogenated styrene butadiene copolymer, exemplified by KRATON G1702, and a carboxylated elastomer such as a maleic anhydride grafted polybutadiene, exemplified by RICOBOND 1731. Long term storage stability was measured by monitoring rheological stability and settling behavior of compositions in Samples 15 and 16 over a period of 7 days. The results are provided in Table 4. The particle sizes were measured over a period of seven days for compositions in Samples 13 and 14 by using Malvern Particle Size Analyzer. The mean particle size diameters remained constant over the seven day period and were in the range of 14 to 17 microns.

TABLE 4

| | Sample 15 | | | | | Sample 16 | | | | |
|---|---|---|---|---|---|---|---|---|---|---|
| Rpm | Day 0 | Day 1 | Day 2 | Day 5 | Day 7 | Day 0 | Day 1 | Day 2 | Day 5 | Day 7 |
| 300 | 300 | 300 | 300 | 300 | 300 | 300 | 300 | 300 | 300 | 300 |
| 200 | 300 | 300 | 300 | 300 | 300 | 300 | 300 | 300 | 300 | 300 |
| 100 | 300 | 300 | 300 | 300 | 300 | 300 | 300 | 300 | 300 | 300 |
| 6 | 70 | 72 | 71 | 70 | 70 | 71 | 73 | 72 | 70 | 70 |
| 3 | 21 | 20 | 20 | 20 | 20 | 20 | 20 | 19 | 20 | 20 |
| Settling | None | None | None | None | None | None | None | None | None | None |

The results in Table 4 indicate that non-settling cement compositions which can be stored for long periods while maintaining stable rheologies can be obtained using the disclosed compositions.

The non-aqueous cement slurries described above were tested for settability by hydration by mixing with sufficient amount of water with agitation to achieve the desired slurry density. Various surfactants were added to test their effectiveness in enabling hydration of cement. The general procedure included mixing 60 grams of cement slurry and 20 ml water to prepare a slurry of density 13.98 ppg. In this mixture, the amount of water was equivalent to 39.4% by weight of cement. The suitability of surfactant was tested by adding few drops of the slurry to a beaker containing water. It was noted that if the slurry had oil as the external phase, the slurry formed oily droplets when added to water. Conversely, if the slurry had water as the external phase, it dispersed immediately upon contacting water and cement particles dispersed in water. Additionally, the slurries were kept at room temperature for 24 hrs or at 120° F. to see if they would set which would be the case if the cement hydrates. Results from optimization of surfactant composition to convert non-aqueous suspensions to water-external cement suspensions are given in Table 5 for Samples 13-17.

TABLE 5

| | SEM-7[1]<br>(1 ml/60 grams slurry) | DUAL<br>SPACER B surfactant[2]<br>(0.75 ml/60 grams slurry) | TWEEN 20[1]<br>(0.5 ml/60 grams slurry) |
|---|---|---|---|
| Sample 13 | Oil external, not set | Water external, not set | Oil external, not set |
| Sample 14 | Oil external, not set | Oil external, not set | Oil external, not set |
| Sample 15 | Oil external, not set | Water external, set at room temp in 24 hrs; set hard at 120° F. in 2 hrs | Oil external, not set |
| Sample 16 | Oil external, not set | Water external; set at room temp in 24 hrs; gelled at 120° F. in 2 hrs | Oil external, not set |
| Sample 17 | Oil external, not set | Oil external, not set | Oil external, not set |

[1]See footnotes in Table 1 for chemical description
[2]nonylphenyl ethoxylate containing more than 10 moles of ethyleneoxide The results in Table 5 show that nonylphenyl ethoxylates containing at least 10 moles of ethylene oxide are suitable surfactants to render the slurries water external or water wet at room temperature sufficient to allow hydration and setting of cement.

Example 3

A slurry was prepared identical to the composition described in Sample 15. The cement slurry was added to sufficient water (39.4% by weight of cement) and surfactant (3.75% by weight of water) and placed in a Waring blender, Sample 18. The slurry was prepared according API Recommended Practice 10B, Twenty-Third Edition, April 2002. The design slurry density was 13.90 ppg. Thickening time was measured at 120° F. according to the API procedure. The thickening time measured was 5 hrs 58 minutes. Thickening time was also measured at 120° F. on a control slurry containing only water and cement in an identical ratio as for that in Sample 15 with no diesel and surfactants. The thickening time was 5 hrs and 48 minutes. This result indicated that diesel and surfactant did not affect the thickening time and the thickening time depended only on cement to water ratio.

The diesel/cement/water slurry described here was also tested for compressive strength development at 120° F. after a 24 hr cure period at atmospheric pressure in a water bath. The compressive strength was 1004 psi. The set cement density was 13.6 ppg.

Example 4

The cement/diesel/water formulation in Sample 18 was tested for fluid loss at 120° F. according to API procedure. The calculated API fluid loss value was 486 cc. In another experiment, a fluid loss agent, HALAD 344 EXP fluid loss additive, which is an oil suspended synthetic polymer available from Halliburton Energy Services, was added in amounts equivalent to 2% active polymer by weight of cement to mix water. The measured fluid loss value at 120° F. was 24 cc. The same value for fluid loss was measured if the fluid loss agent was added to the slurry directly instead of addition to the mix water prior to the addition of cement. These results indicate that diesel/cement/water slurries respond to cement slurry additives similar to the slurries which do contain diesel.

Example 5

The purpose of the experiment was to adjust the density of the cement slurry to any desired value by the addition of a suitable density modifying agent to a pre-mixed, stored nonaqueous cement slurry. Thus, a weighting additive namely HI-DENSE 4 weighting agent, which is a weighting additive commercially available from Halliburton Energy Services, with a specific gravity of 5.2 was added at 10% by weight of cement to the slurry prepared as in Sample 15. Upon mixing with water (17.07% by weight of cement and water surfactant, DUAL SPACER B surfactant) as described previously, the slurry density was measured to 16.4 ppg. The slurry was tested for compressive strength by curing at 120° F. for 20 hrs in water bath. The compressive strength was 785 psi.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore comprising:
   (a) preparing a nonaqueous storable cementitious composition;
   (b) mixing said composition with an aqueous fluid; and
   (c) placing said composition into a wellbore,
   wherein the nonaqueous storable cement composition comprises cement, a suspension fluid, a dehydrating agent, an oil wetting surfactant, and a suspension aid, and
   wherein the dehydrating agent is a high surface area silica, a zeolitic material, a molecular sieve, a cementitious material, or combinations thereof.

2. The method of claim 1 wherein the suspension fluid is a nonaqueous solvent with a flash point of greater than or equal to about 140° F.

3. The method of claim 1 wherein the dehydrating agent is a material capable of reducing the water content of a nonaqueous fluid to less than about 5% and is present in an amount of equal to or less than about 25% by weight of the nonaqueous fluid.

4. The method of claim 3 wherein the dehydrating agent is present in an amount from about 5% to about 20% by weight of the nonaqueous fluid.

5. The method of claim 1 wherein the oil wetting surfactant has a hydrophilic-lipophilic balance of less than or equal to 7.0.

6. The method of claim 1 wherein the suspension aid is a polymer, a homopolymer, a copolymer, an elastomer, a polyolefin grafted with polar monomers, or combinations thereof.

7. The method of claim 1 wherein the suspension aid is a polyolefin grafted with maleic anhydride.

8. The method of claim 1 further comprising a viscosifying agent.

9. The method of claim 8 wherein the viscosifying agent comprises an elastomer, a dissolved organic polymer, an organophosphate/iron salt combination, a fatty acid and aluminum salt combination, or combinations thereof.

10. The method of claim 9 wherein the elastomer comprises a polyolefin grafted with polar monomers.

11. The method of claim 1 wherein the suspension aid comprises a polymerized diene.

12. The method of claim 1 wherein the suspension fluid comprises an aliphatic hydrocarbon, an oxygenated solvent, or combinations thereof in an amount of at least about 5% by total weight of the nonaqueous storable cementitious composition.

13. The method of claim 1 wherein the cement comprises a hydraulic cement in an amount of at least about 80% by weight of the composition.

14. The method of claim 1 wherein the oil wetting surfactant comprises a nonylphenylethoxylate with less than 5 moles of ethylene oxide, a fatty acid, a salt of a fatty acid, a sorbitan monolaurate, a propylene glycol monostearate, a sorbitan distearate, or combinations thereof.

15. The method of claim 1 wherein the oil wetting surfactant is present in an amount from about 0.1% to about 10% by weight of the suspension fluid.

16. A method of cementing comprising:
   (a) preparing a mixture of cement, a suspension fluid, a dehydrating agent, a first surfactant, and a suspension aid;
   (b) adding an aqueous solution and a second surfactant to said mixture;
   (c) placing the mixture downhole; and
   (d) allowing the cement to set,
   wherein the first surfactant has a hydrophilic-lipophilic balance less than or equal to 7, and wherein the suspension aid is an elastomer comprising polar monomers.

17. The method of claim 16 wherein the suspension fluid is a nonaqueous fluid having a flash point of equal to or greater than about 140° F.

18. The method of claim 16 wherein the dehydrating agent is a material capable of reducing the water content of a nonaqueous fluid to less than about 5% and is present in an amount of equal to or less than about 25% by weight of the nonaqueous fluid.

19. The method of claim 16 wherein the dehydrating agent is contacted with the suspension fluid prior to the addition of other slurry components.

20. The method of claim 16 further comprising a viscosifying agent.

21. The method of claim 16 wherein the second surfactant has a hydrophilic-lipophilic balance of greater than or equal to about 10.

22. The method of claim 16 wherein the mixture comprises at least about 5 weight percent suspension fluid, from about 1 weight percent to about 25 weight percent dehydrating agent, from about 0.1 weight percent to about 10 weight percent first surfactant, and from about 0.05 weight percent to about 10 weight percent suspension aid.

23. The method of claim 16 wherein the mixture comprises at least about 10 weight percent suspension fluid, from about 10 weight percent to about 15 weight percent dehydrating agent, from about 0.5 weight percent to about 4 weight percent first surfactant, and from about 0.1 weight percent to about 5 weight percent suspension aid.

24. The method of claim 16 wherein the suspension fluid comprises an aliphatic hydrocarbon, an oxygenated solvent, or combinations thereof in an amount of at least about 5% by total weight of the nonaqueous storable cementitious composition.

25. The method of claim 16 wherein the cement comprises a hydraulic cement in an amount of at least about 80% by weight of the composition.

26. The method of claim 16 wherein the first surfactant comprises a nonylphenylethoxylate with less than 5 moles of ethylene oxide, a fatty acid, a salt of a fatty acid, a sorbitan monolaurate, a propylene glycol monostearate, a sorbitan distearate, or combinations thereof.

27. A method of cementing comprising:
(a) preparing a mixture of cement, a suspension fluid, a dehydrating agent, a first surfactant, and a suspension aid;
(b) adding an aqueous solution and a second surfactant to said mixture;
(c) placing the mixture downhole; and
(d) allowing the cement to set,
wherein the first surfactant has a hydrophilic-lipophilic balance less than or equal to 7 and wherein the dehydrating agent is a high surface area silica, a zeolitic material, a molecular sieve, a cementitious material or combinations thereof.

28. A method of cementing comprising:
(a) preparing a mixture of cement, a suspension fluid, a dehydrating agent, a first surfactant, and a suspension aid;
(b) adding an aqueous solution and a second surfactant to said mixture;
(c) placing the mixture downhole; and
(d) allowing the cement to set,
wherein the first surfactant has a hydrophilic-lipophilic balance less than or equal to 7 and wherein the suspension aid is an elastomer grafted with maleic anhydride.

* * * * *

UNITED STATES PATENT AND TRADEMARK OFFICE
CERTIFICATE OF CORRECTION

PATENT NO. : 7,575,055 B2  Page 1 of 1
APPLICATION NO. : 11/428771
DATED : August 18, 2009
INVENTOR(S) : Reddy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 401 days.

Signed and Sealed this

Seventh Day of September, 2010

David J. Kappos
*Director of the United States Patent and Trademark Office*